United States Patent [19]

Rao et al.

[11] Patent Number: 4,875,754
[45] Date of Patent: Oct. 24, 1989

[54] OPTICAL FIBER CONNECTOR

[75] Inventors: Ram A. Rao, Middletown; Mogens Kofod, Howell; Julius Puchammer; George Galiotti, both of Edison, all of N.J.

[73] Assignee: Minnesota Mining and Manufacturing Company, Saint Paul, Minn.

[21] Appl. No.: 90,790

[22] Filed: Aug. 28, 1987

[51] Int. Cl.[4] .................................................. G02B 6/38
[52] U.S. Cl. .................................. 350/96.20; 350/96.21
[58] Field of Search ............................ 350/96.20, 96.21

[56] References Cited

U.S. PATENT DOCUMENTS 4,173,389 11/1979 Curtis .................................. 350/96.2

FOREIGN PATENT DOCUMENTS 0009115 1/1983 Japan ................................... 350/96.2

Primary Examiner—James W. Davie
Attorney, Agent, or Firm—Donald M. Sell; Walter N. Kirn; Stephen W. Buckingham

[57] ABSTRACT

An optical fiber connector comprises an elongate plug support member having an interior bore extending between opposed first and second ends thereof, a plug circumscribing a portion of the plug support member adjacent the second end thereof, extending therewithin and also longitudinally outward of the second end. The plug defines an interior bore extending therethrough into communication with the plug support member bore and may be in alignment or in intersecting relation therewith, in respective different types of connectors. An insert is disposed in the plug interior bore and is successively radially circumscribed by the plug and the plug support member. The insert defines an interior passage for receiving an optical fiber and centers same with respect to the plug interior bore.

28 Claims, 4 Drawing Sheets

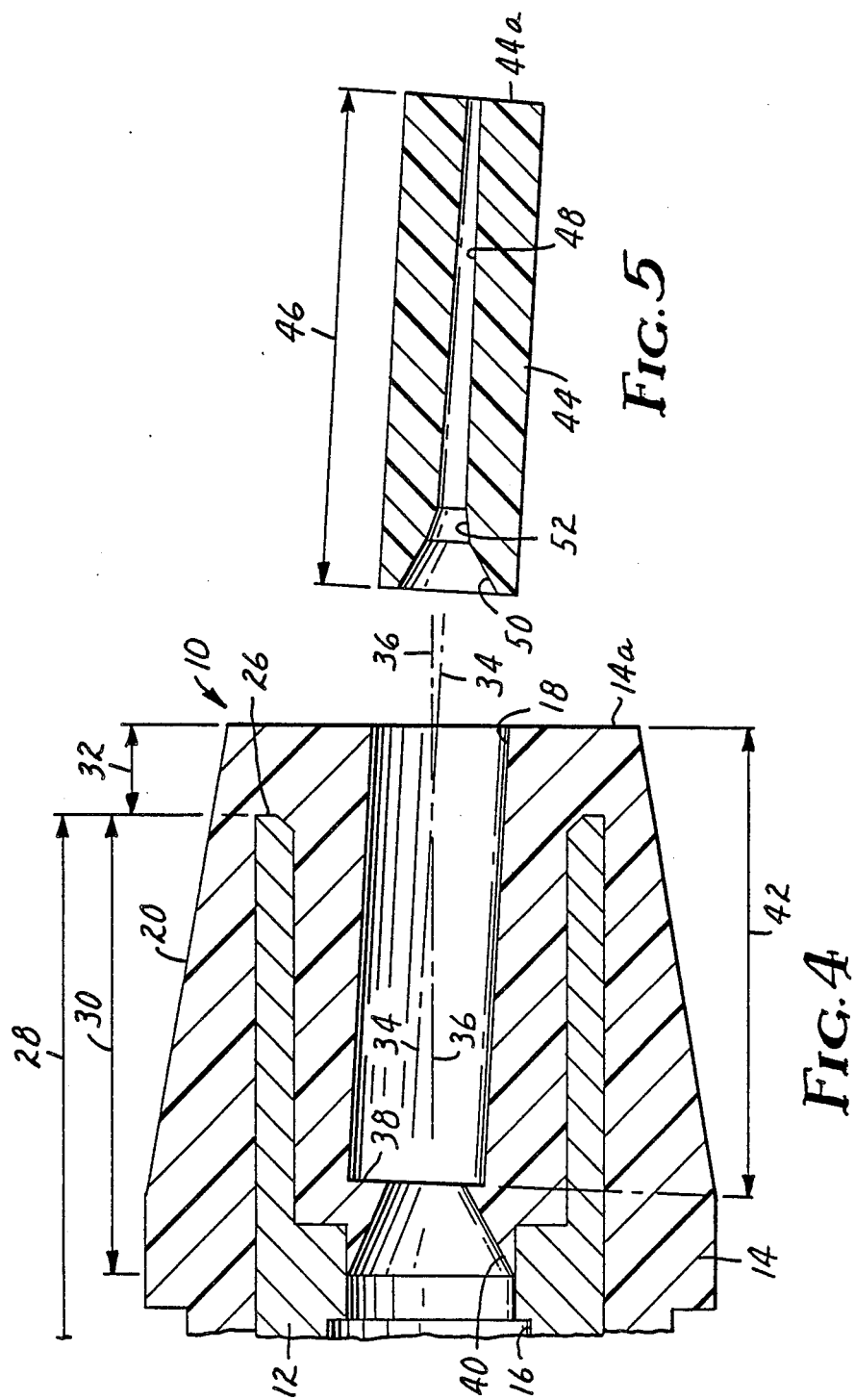

OPTICAL FIBER CONNECTOR

FIELD OF THE INVENTION

The invention relates generally to optical fiber connectors and pertains more particularly to improved connectors of so-called biconical type and methods for making same.

BACKGROUND OF THE INVENTION

Pending U.S. patent application Ser. No. 700,458, filed on Feb. 11, 1985 and entitled "Method and Apparatus for Effecting Light Energy Transmission", U.S. Pat. No. 4,695,126, discloses an optical fiber connector of biconical type, wherein a plug has a fiber seated therein and defines a frustro-conical outer surface (cone) about the seated fiber. A companion, mating component has a complemental frustro-conical surface interiorly thereof for receiving the plug and supports therein a second fiber or active component for coupling to the first fiber. Typically, the companion component is in the form of a sleeve having frustro-conical interior surfaces extending inwardly from opposite ends thereof for respective coupling of a pair of plugs and their seated fibers to one another.

The plugs of such '458 application connectors seat an end course of a fiber in disposition inclined relative to the plug central axis and the exposed fiber end face is polished at an angle so related to the fiber inclination angle as to render the light energy output axis of the connector coincident with the plug central axis.

Other biconical connectors also commercially available from the assignee hereof are similar in construction to that of the '458 patent, but have the fiber disposed in the plug with the fiber axis coincident with the plug central axis. This type of "standard" biconical connector is a predecessor of the connector of the '458 patent, but remains usable in various applications.

A significant quality control standard for both of the foregoing types of biconical connectors is precise angular disposition of the fiber therein, i.e., inclined or coincident with the plug central axis. Rather substantial rejections of fabricated connectors have heretofore been seen in quality control inspection on the basis of this control standard.

In heretofore known practice for making both types of connectors, the plug has been a molded member throughout, having a bore opening into an end thereof opposite the conical end and formed by a first mandrel upon which the plug was molded in a first molding jacket. This mandrel terminated slightly axially beyond the start of the cone and a second continuation mandrel, in the form of a wire of the diameter of the fiber and its cladding, was secured to the end of the first mandrel. The remote end of the wire was captured by a jewel of a companion molding jacket at a position according with the desired angulation of the fiber in the final assembly, i.e., coincident with the plug central axis in the case of the standard connector and inclined with respect to the plug central axis in the case of the '458 patent connector.

In the described prior practice, the disposition of the wire, and subsequently the fiber inserted in the passage formed by the wire, was highly dependent on both displacement of the wire in response to molding material forces thereon and on the position of the jewel. Both of these factors bear particularly o failure to meet the above quality control standard.

SUMMARY OF THE INVENTION

The present invention has as its primary object the provision of improved optical fiber connectors.

A more particular object of the invention is to provide solutions to the aforementioned quality control yield problems heretofore faced by the art.

In attaining the foregoing and other objects, the invention provides an optical fiber connector, comprising an elongate plug support member having an interior bore extending between opposed first and second ends thereof, a plug circumscribing a portion of the plug support member adjacent the second end thereof, extending therewithin and also being longitudinally outward of the second end. The pug defines an interior bore extending therethrough into communication with the plug support member bore and, in the case of the '458 patent connector, being in intersecting relation therewith. An insert is disposed in the plug interior bore and is successively radially circumscribed by the plug and the plug support member. The insert defines an interior passage for receiving an optical fiber and centers same with respect to the plug interior bore.

As will be more fully discussed below, the invention forces an expansion of the plug bore of the prior art to a measure vastly exceeding same and being a multiple of the composite diameter of the optical fiber and its cladding, thereby enhancing symmetry as between the plug bore end face and the frustro-conical exterior surface of the plug.

The invention further provides, in a method for making an optical fiber connector, the steps of configuring a molding core to define an interior bore and closing the bore at a preselected axial location therealong by disposing a core mandrel therein and configuring a molding jacket for assembly with the molding core to circumscribe an end portion of the molding core and therewith define a molding cavity to form a plug exteriorly thereon, interiorly of the molding core up to such preselected location, and axially beyond the core mandrel. The molding jacket is further formed to have a molding jacket mandrel fixedly disposed therein and matable with the core mandrel upon assembly of the molding core and the molding jacket, thereby to form a passage extending throughout the molding core and the molding jacket. One assembles the molding core and the molding jacket, introduces molding material into the cavity to form the connector and removes the core mandrel and the molding jacket from the formed connector. The molding core remains with the formed product as the aforementioned plug support member.

The molding jacket mandrel functionally replaces the wire of the prior art practice and is substantially invariant in position in response to pressures of molding material. Further, the molding jacket mandrel has fixed disposition in the molding jacket as contrasted with the dependency of the prior art wire on registry with a jewel movable into position therewith. Additionally, the plug of the invention exhibits exteriorly thereof, a rigid, machined member with true circularity for reference in grinding operations, namely, an exposed end section of the molding core remaining as the plug support member.

The foregoing and other objects and features of the invention will be further understood form the following detailed description of preferred embodiments thereof

DESCRIPTION OF THE DRAWINGS

FIG. 4 an enlarged sectional view of the rightward end part of FIG. 3.

FIG. 5 is a sectional central view of an insert usable with the FIG. 1 connector.

DETAILED DESCRIPTION OF PREFERRED EMBODIMENTS AND PRACTICES

Figure 2:
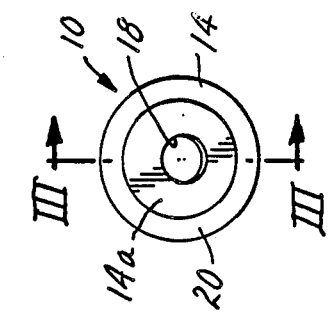
FIG. 2 is a right end elevation of the FIG. 1 connector.
Figure 1:
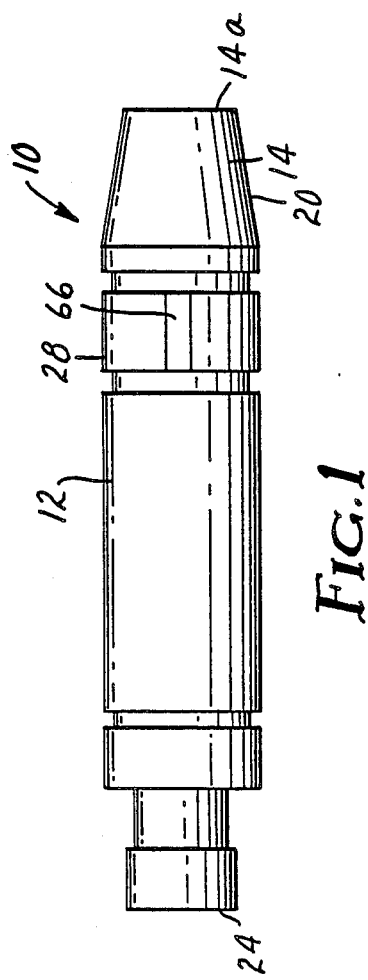
FIG. 1 is a side elevational view of a connector of the invention.
Figure 3:
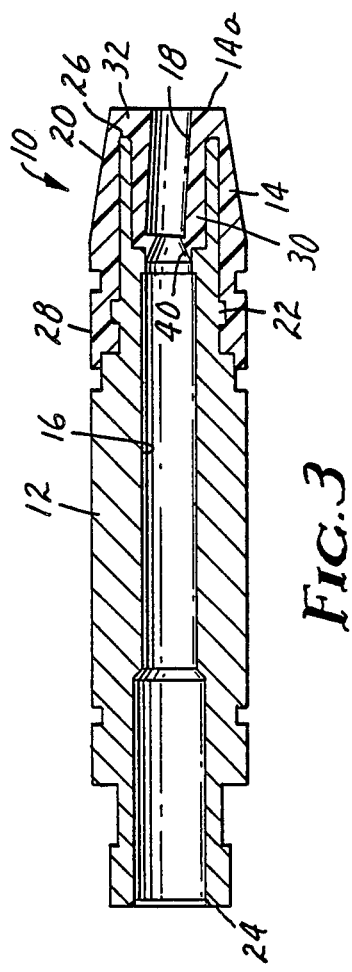
FIG. 3 is a sectional view of the FIG. 1 connector as would be seen from plane III—III of FIG. 2.

Referring to FIGS. 1 through 4, optical fiber connector 10 includes a plug support member 12, preferably comprised of a machined metal component, and a plug 14 of plastic and molded on support member 12. Support member 12 has an interior bore 16 and plug 14 has an interior bore 18 communicating with bore 16 and terminating at plug end face 14a. Plug 14 has an exterior frustro-conical surface 20 and is axially detented on support member 12 by projecting rib 22.

Support member 12 has a first open end 24 and a second end 26, which is open fully prior to molding of plug 14 therewith. Plug 14 will be seen to comprise a first portion 28 which circumscribes support member 12, a second portion 30 which is disposed interiorly of support member 12, and a third portion 32 which is axially beyond or outboard of end 26 of support member 12 and extends to plug end face 14a.

As is seen more readily in the enlarged showing of FIG. 4, plug bore 18 has its axis 34 inclined at an acute angle with respect to the central axis 36 of support member bore 16, in accordance with practice discussed in the above-referenced '458 patent application, which is incorporated herein by this reference. A stop surface 38 for an insert, to be discussed below, is provided in plug bore 14, which further defines a frustro-conical interior surface 40 providing a transition for a fiber from support member bore 16 into plug bore 18. The axial length of plug bore 18 is indicated at 42.

Figure 6:
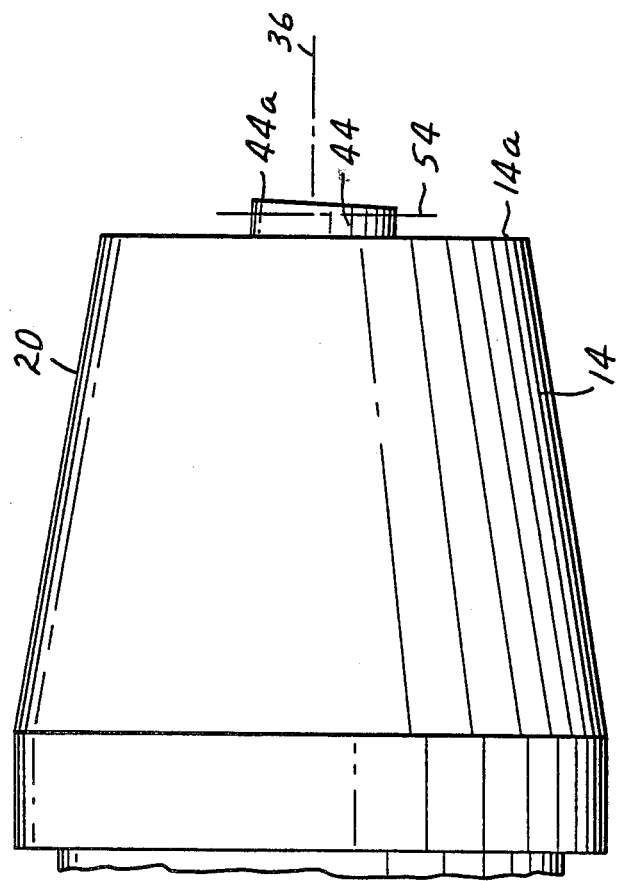
FIG. 6 is an enlarged view, on the FIG. 4 scale, of the rightward end part of FIG. 3, with an optical fiber assembled with the connector of FIG. 1.

Turning to FIG. 5, insert 44 is of length 46, exceeding plug bore length 42, and of cross-sectional dimension commensurate with that of plug bore 18 for relatively tight insertion fit therein. Insert 44 may be of ceramic material and defines a central bore 48 extending from inlet frustro-conical surfaces 50 and 52 to insert end face 44a. Such mutual length relationship as between insert 44 and plug bore 18 gives rise to the assembly relationship shown in FIG. 6, wherein insert 44 is seated and cemented in plug 14 and extends beyond plug end face 14a, permitting polishing of the fiber end face to conform to plane 54, again in accordance with the dictates of the referenced '458 patent application and issuance of connector light output along connector central axis 36.

In one relationship established in the present invention, the cross-sectional dimension of plug bore 18 (and insert 44) vastly exceeds the diameter of the fiber plus its cladding, as by a multiple and desirably by an order of magnitude. This matter will be understood further by considering in some detail the prior methodology attending commercial manufacture of connectors of the subject type.

In prior practice as noted above, the disposition of the wire, and subsequently the fiber inserted in the passage formed by the wire, was highly dependent on both displacement of the wire in response to molding material forces thereon and on the relative position of the jewel molding jacket with respect to the plug support member. Inaccurate angle magnitude and orientation caused difficulty as against ensuring that the light output would be on the central axis of the connector.

Figure 7:
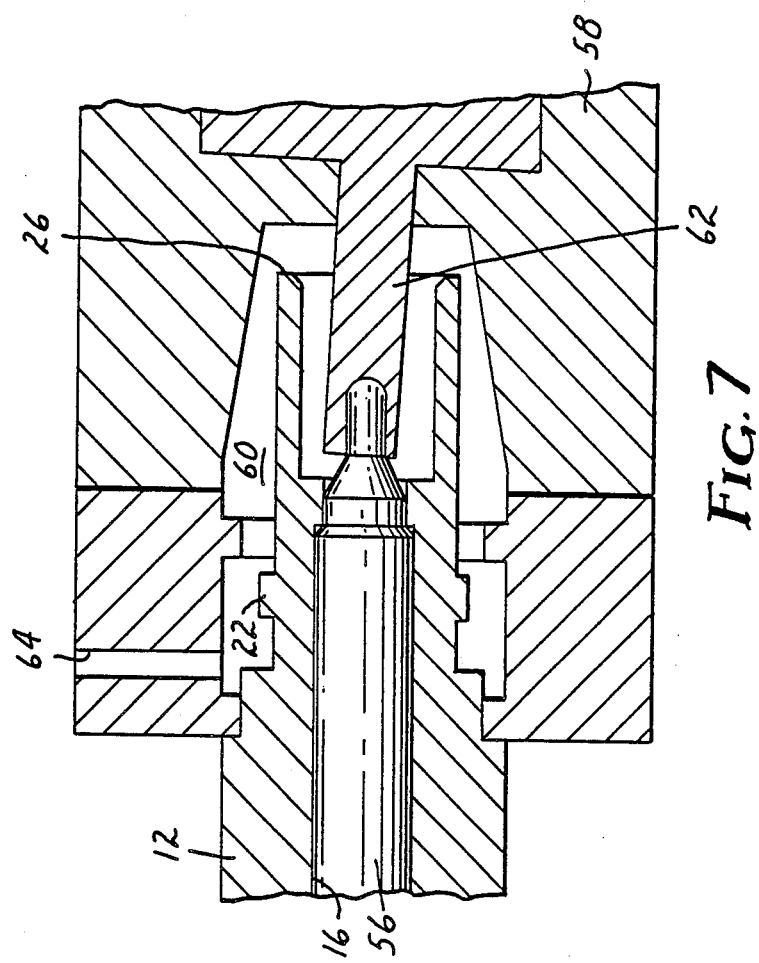
FIG. 7 shows a central sectional view of injection molding apparatus for the making of the connector of FIG. 1.

The practice in accordance with the invention at hand will be seen in FIG. 7 and other figures. In a first step, one configures a molding core (plug support member 12), to define an interior bore (bore 16), and closes such bore at a preselected axial location therealong by disposing therein a core mandrel 56. The practitioner further provides a molding jacket 58 in configuration for assembly with molding core 12 to circumscribe an end portion of the molding core and therewith define a molding cavity 60 to form a plug (1) exteriorly thereon, (2) interiorly of the molding core up to such preselected location, and (3) axially beyond the core mandrel. Molding jacket 58 is further formed to have a molding jacket mandrel 62 fixedly disposed therein and matable with core mandrel 56 upon assembly of the molding core and the molding jacket, thereby to form a passage extending throughout the molding core and the molding jacket.

Molding core 12 and molding jacket 58 are now assembled, as in FIG. 7, and one introduces molding material into cavity 60 through feed path 64 to form the connector. Upon setting of the molding material, the practice involves removing the core mandrel and the molding jacket from the formed connector.

As above noted, selection is made such that the optical fiber to be employed with such connector has a core and core cladding of given composite diameter and wherein molding jacket mandrel 62 is selected to have a cross-sectional dimension in excess of such given composite diameter. Further, in making the particular connectors of the referenced patent application type, molding jacket mandrel 62 is so mounted in molding jacket 58 that, upon assembly of the molding core and the molding jacket, the core mandrel and the jacket mandrel are in mutually intersecting relation. Further, it is preferrable to configure the core mandrel and the molding jacket mandrel with mutually complementary ends for such mating thereof. A notch 66 (FIG. 1) is formed in the molding process in the same plane as the central plane of core mandrel 16 to facilitate accurate polishing of the fiber end face per the '458 patent.

To complete description of the practice of the invention, since plug bore 18 is of greatly increased diameter over that in the prior practice and since the jacket mandrel is an integral part of such jacket, it is found that the definition of the fiber angle and orientation are well-controlled. Further, since the core mandrel defines a controlled circular surface, preferably provided as a machined metal component, and exhibits exposed cylindrical surface in the final connector, grinding operations are improved over those otherwise obtaining in the prior connectors, which exhibited molded plastic exteriors throughout the length of the connectors.

While the foregoing discussion has centered on the connector type described in the '458 patent, it will be appreciated, as alluded to at the outset above, that method of the invention and its product structure are equally applicable to the making of the standard type of biconical connector wherein the fiber is to be disposed in coincidence with the connector central axis. Thus, the aforementioned control of fiber angle at zero to the connector central axis and orientation in the standard connector are served by the invention, as is the enhanced effectiveness of the grinding operation.

Various changes may be made to the foregoing structure and modification may be introduced in the foregoing practices without departing form the invention. For example, while the insert is configured in FIG. 5 as an integral body, other fiber centering inserts may be employed, such as the well-known arrangement of three cylindrical rods having a fiber disposed therewithin. Further, the invention contemplates molding of such insert in situ. Accordingly, it is to be understood that the particularly disclosed and depicted embodiments and methods are intended in an illustrative and not in a limiting sense. The true spirit and scope of the invention is set forth in the following claims.

What is claimed is:

1. An optical fiber connector, comprising:
   (a) an elongate plug support member having an interior bore extending between opposed first and second ends thereof;
   (b) a plug circumscribing a portion of said plug support member adjacent said second end thereof, extending therewithin and also being longitudinally outward of said second end, said plug defining an interior bore extending therethrough into communication with said plug support member bore; and
   (c) an insert disposed in said plug interior bore and successively radially circumscribed by said plug and said plug support member, said insert defining an interior passage for receiving an optical fiber and centering same with respect to said plug interior bore.

2. The invention claimed in claim 1 wherein said plug has an exterior frustro-conical surface tapering radially lesseningly to an end face of said plug longitudinally outward of said plug support member second end.

3. The invention claimed in claim 2 wherein said plug interior bore is concentric with said plug frustro-conical surface at said end face of said plug.

4. The invention claimed in claim 3 wherein said plug interior bore defines a further frustro-conical surface interiorly thereof providing a transition from said plug support member interior bore to said plug interior bore.

5. The invention claimed in claim 4 wherein said plug interior bore defines an inward stop surface for said insert adjacent said further frustro-conical surface.

6. The invention claimed in claim 5 wherein the length of said plug interior bore from said stop surface to said plug end face is less than the length of said insert.

7. The invention claimed in claim 6 wherein said insert comprises a cylindrical body having a central passage therethrough of diameter generally equal to the to the diameter of said optical fiber with its cladding.

8. The invention claimed in claim 7 wherein said insert includes a still further frustro-conical surface therein providing a transition from said plug interior bore to said insert cylindrical passage.

9. The invention claimed in claim 1 wherein said plug support member is a machined metal component having exposed cylindrical surface in said connector.

10. An optical fiber connector, comprising:
    (a) an elongate plug support member having
       (1) an interior bore opening into opposed first and second ends thereof,
       (2) exterior surface of a first diameter at said first end and of a second diameter at said second end, said first diameter exceeding said second diameter, said exterior surface including a stepped portion between said first and second ends and of diameter intermediate said first and second diameters;
    (b) a plug
       (1) formed upon said plug support member in circumscribing relation to said stepped portion thereof and extending continuously therefrom beyond said plug support member second end to define an end face, and
       (2) extending interiorly of said plug support member within said second end thereof, and
       (3) defining an interior bore communicating with said plug support member; and
    (c) insert means seated in said plug bore for receiving an optical fiber and for centering said optical fiber in said plug bore.

11. The invention claimed in claim 10 wherein said plug has an exterior frustro-conical surface tapering radially lesseningly to an end face of said plug longitudinally outward of said plug support member second end.

12. The invention claimed in claim 11 wherein said plug interior bore is concentric with said plug frustro-conical surface at said end face of said plug.

13. The invention claimed in claim 12 wherein said plug interior bore defines a further frustro-conical surface interiorly thereof providing a transition from said plug support member interior bore to said plug interior bore.

14. The invention claimed in claim 13 wherein said plug interior bore defines an inward stop surface for said insert adjacent said further frustro-conical surface.

15. The invention claimed in claim 13 wherein said plug interior bore from said stop surface to said plug end face is less than the length of said insert.

16. The invention claimed in claim 15 wherein said insert comprises a cylindrical body having a central passage therethrough of diameter generally equal to the diameter of said optical fiber with its cladding.

17. The invention claimed in claim 16 wherein said insert includes a still further frusto-conical surface therein providing a transition from said plug interior bore to said insert cylindrical passage.

18. The invention claimed in claim 10 wherein said plug support member is a machined metal component having exposed cylindrical surface in said connector.

19. A kit of parts for the making of an optical fiber connector, comprising:
    (a) an elongate plug support member having an interior bore extending between opposed first and second ends thereof;
    (b) a plug circumscribing a portion of said plug support member adjacent said second end thereof, extending therewithin and also being longitudinally outward of said second end, said plug defining an interior bore extending therethrough into communication with said plug support member bore; and (c) an insert having a cross-sectional dimension commensurate with that of said plug interior bore and thereby being insertable therein, said insert defining an interior passage for receiving an optical fiber and for centering same with respect to said plug interior bore.

20. The invention claimed in claim 19 wherein said insert is of length exceeding that of said plug interior bore, said insert thereby being adapted to situate the end face of said optical fiber outwardly of said plug for polishing of the end face of said fiber.

21. The invention claimed in claim 19 wherein said plug interior bore defines an inward stop surface for said insert adjacent said further frustro-conical surface.

22. The invention claimed in claim 21 wherein said insert comprises a cylindrical body having a central passage therethrough of diameter generally equal to the diameter of said optical fiber with its cladding.

23. The invention claimed in claim 22 wherein said insert includes a still further frustro-conical surface therein providing a transition form said plug interior bore to said insert cylindrical passage.

24. The invention claimed in claim 19 wherein said plug support member is a machined metal component having exposed cylindrical surface in said connector.

25. An optical fiber connector, comprising:
 (a) an elongate plug support member having an interior bore extending between opposed first and second ends thereof;
 (b) a plug circumscribing a portion of said plug support member adjacent said second end thereof, extending therewithin and also being longitudinally outward of said second end, said plug defining an interior bore extending therethrough into communication with said plug support member bore and being in intersecting relation therewith; and
 (c) an insert disposed in said plug interior bore and successively radially circumscribed by said plug and said plug support member, said insert defining an interior passage for receiving an optical fiber and centering same with respect to said plug interior bore.

26. The invention claimed in claim 25 wherein said plug support member is a machined metal component having exposed cylindrical surface in said connector.

27. An optical fiber connector, comprising:
 (a) an elongate plug support member having
  (1) an interior bore opening into opposed first and second ends thereof,
  (2) exterior surface of a first diameter at said first end and of a second diameter at said second end, said first diameter exceeding said second diameter, said exterior surface including a stepped portion between said first and second ends and of diameter intermediate said first and second diameters;
 (b) a plug
  (1) formed upon said plug support member in circumscribing relation to said stepped portion thereof and extending continuously therefrom beyond said plug support member second end to define an end face, and
  (2) extending interiorly of said plug support member within said second end thereof, and
  (3) defining an interior bore communicating with said plug support member bore and forming a predetermined angle therewith; and
 (c) insert means seated in said plug bore for receiving an optical fiber and for centering said optical fiber in said plug bore.

28. The invention claimed in claim 27 wherein said plug support member is a machined metal component having exposed cylindrical surface in said connector.

* * * * *